United States Patent [19]

Tezuka et al.

[11] Patent Number: 5,002,626

[45] Date of Patent: Mar. 26, 1991

[54] METHOD OF PREPARING CONTINUOUS LABEL PAPER

[75] Inventors: Motohiko Tezuka, Chiba; Jiunichi Tabuchi, Tokyo; Yoshihide Okubo; Takeshi Kobayashi, both of Chiba, all of Japan

[73] Assignee: Toppan Moore Co., Ltd., Tokyo, Japan

[21] Appl. No.: 343,253

[22] Filed: Apr. 26, 1989

Related U.S. Application Data

[62] Division of Ser. No. 251,090, Sep. 28, 1988, Pat. No. 4,952,433.

[51] Int. Cl.[5] .......... B32B 31/18

[52] U.S. Cl. .......... 156/252; 156/253; 156/267; 156/271

[58] Field of Search .......... 156/271, 267, 252, 253; 428/42

[56] References Cited

U.S. PATENT DOCUMENTS

| | | | |
|---|---|---|---|
| 3,958,051 | 5/1976 | Smith | 156/253 |
| 4,153,496 | 5/1979 | Swift | 156/267 |
| 4,260,444 | 4/1981 | Fowler | 156/267 |
| 4,528,055 | 7/1985 | Hattemer | 156/267 |

FOREIGN PATENT DOCUMENTS

| | | | |
|---|---|---|---|
| 876101 | 8/1961 | United Kingdom | 156/252 |

*Primary Examiner*—Wilbur Bascomb

*Attorney, Agent, or Firm*—Wenderoth, Lind & Ponack

[57] ABSTRACT

A method of preparing continuous label paper from a continuous paper consisting of a label sheet coated with an adhesive on the back side thereof and a support sheet detachably adhered to the back side of the label sheet and which sheets are wider than a finished width of the continuous label paper. The steps include forming a plurality of transfer holes at equal intervals along both lateral edges of the finished width of at least the supporting sheet of the continuous paper, forming slits along the side portions of the supporting sheet at positions corresponding to the finished width of the continuous label paper to define excess width portions laterally outwardly of the slits, cutting cut lines in the label sheet to form label pieces in the label sheet spaced at intervals therealong, cutting edge lines in the label sheet adjacent lateral edge portions thereof at positions where the edge lines do not overlie portions of the support sheet corresponding to transfer holes, and which edge lines have an irregular shape defining projections extending closer to the lateral edges of the finished width of the supporting sheet than the positions of the transfer holes, thereby defining unnecessary label sheet portions laterally outwardly of the edge lines, and after the edge line cutting step and the slit forming step, simultaneously removing the excess width portions and the unnecessary label sheet portions from the supporting sheet.

3 Claims, 5 Drawing Sheets

METHOD OF PREPARING CONTINUOUS LABEL PAPER

This application is a division of application Ser. No. 07/251,090, filed Sept. 29, 1988 now U.S. Pat. No. 4,952,433.

BACKGROUND OF THE INVENTION

The present invention relates to a continuous label paper, for providing labels having a back side coated with an adhesive, and prepared from continuous paper lengths consisting of a label sheet provided with label pieces and a support sheet, detachably attached to the back side of the label sheet, and it also relates to a method to prepare it.

In the conventional type of continuous label paper, a continuous label sheet with an adhesive backing is provided, and a support sheet is attached by the adhesive in a detachable manner on the back side of the label sheet, and a portion of the label paper is provided with transfer holes at equal spacings along both lateral sides. Perforation lines are provided in the label sheet other than the portion with transfer holes in order to form label pieces, which can be removed from the label sheet and attached to envelopes and other articles with different information and data such as addresses, product numbers, product names, etc. The transfer holes of said continuous label paper engage with the tractor pins of a printer connected to a computer, and address information, delivery data, etc. are printed on said label pieces by moving said continuous label paper through the printer.

In such a conventional continuous label paper, however, when printing is performed on a large quantity of continuous label paper, especially when a non-impact printer which prints by means of toner is used, adhesive coming out of the transfer hole of the continuous label paper sticks on and is accumulated on and around the tractor pins of the printer and often contaminates the photosensitive drum, thus adversely affecting the movement of subsequent continuous label paper.

To overcome such disadvantage, a type of continuous label paper is known where the transfer holes are not provided in the label sheet in order to prevent the adhesive from coming out of the transfer holes. However, in preparing continuous label paper of such type, the toner on the surface of the photosensitive drum of the non-impact printer is attached to the portion of the detachment sheet with the transfer holes, which is exposed because the transfer holes are eliminated from the label sheet. Since the toner is further attached and accumulated in zonal form on the fixed roller or other parts of the non-impact printer, it frequently causes the jamming of continuous label paper. Zonal contamination often occurs when continuous label papers having different widths are used.

In order to eliminate all such disadvantages, a new type of continuous label paper 100 has been proposed (Japanese Utility Model Publication Sho 61-41105). As shown in FIGS. 7(*a*) to (*d*), the continuous label paper consists of supporting sheet 103 detachably mounted on the back side of the label sheet 102 coated with adhesive 101, and the transfer holes 104 are provided along both lateral sides of supporting sheet 103 at equal spacings. Both lateral sides of the label sheet are formed in an uneven and irregular shape so that the label sheet 102 does not come into contact with the transfer holes 104 and it reaches the lateral edge of the continuous label paper only by projecting portions 102*b* between transfer holes 104.

To prepare continuous label paper 100, it is necessary to have a process to detach an external portion of the label sheet, which initially overlies the position of the transfer holes 104 at the time of assembly of the sheets and which is not needed in the finished label paper because both lateral edges of the label sheet 102 are shaped in an uneven and irregular form.

However, if the width of the label paper is as is shown by solid lines in FIG. 7, the external portions 102*a* of the label sheet overlying the positions of the transfer holes 104, as shown in FIG. 7(*c*), and not needed, are not continuous in the longitudinal direction of the label paper but separated from each other. Accordingly, it is not possible to efficiently detach the external portions 102*a* of the label sheet 102 in a continuous manner.

There is a method to exclude such disadvantages. As shown by dot-dash lines in FIG. 7(*a*), it has been proposed to make the width of the sheets making up the continuous label paper wider at first. After the unnecessary portions 102*a* of the label sheet 102, including the added width portion, are detached by simply peeling them away as a continuous strip 102*c*, shown in FIG. 7(*d*), the added width portion 103*a* of the remaining supporting sheet 103 is removed by cutting it off to make the label paper the width originally desired.

Even with this method, however, there exist in the strip 102*c* wide portions (the portions complementary to where the label sheet 102 is recessed to match the transfer holes 104) and the very narrow portions (the portions complementary to where the label sheet 102 protrudes), and the strip 102*c* is often torn off at this very narrow portion during the peeling off of the strip. Because the unnecessary portions 102*a* on both sides are independent from each other, the continuity of the strip 102*c* of the unnecessary portions of the label sheet 102 is lost if these are torn, and smooth peeling away is thus hindered.

In the transfer system for the label paper, where the printing paper is transferred by bringing it into contact with a preheated board through suction in order to fix the toner after toner is deposited by a non-impact printer of the xerography type, smooth printing is not achievable because of poor air penetration when the label paper has a three-layer structure consisting of a label sheet, adhesive, and a detachment sheet. Specifically, excessive suction occurs during the transfer operation of the printer, and smooth movement is not accomplished because the resistance to movement in the transfer direction is increased. In addition, toner often falls off due to excessive contact and contaminates the interior of the printer.

OBJECTS OF THE INVENTION

The first object of the present invention is to provide a continuous label paper which eliminates the disadvantages of the conventional label paper as shown in FIG. 7, and to provide a method to prepare such paper. The second object of the present invention is to provide a continuous label paper suitable for printing by a non-impact printer using toner to print various information and data such as addresses, product names, etc. on the surface of label pieces, and a method to prepare such label paper. The third object of the invention is to provide a continuous label paper on which smooth printing is achievable by a printer using suction during the transfer process.

BRIEF SUMMARY OF THE INVENTION

To attain the above objects, the continuous label paper according to this invention comprises a continuous strip of label paper consisting of a label sheet coated on the back side thereof with adhesive and a supporting sheet, which is detachably attached to the back side of the label sheet and which has a width greater than a finished width. Slits are formed at positions of the edges corresponding to the finished width of the supporting sheet, and a number of transfer holes are provided along both lateral sides at equal distances. A number of transverse perforations are formed to facilitate the folding therealong, these being spaced at equal distances in the longitudinal direction of the strip. Further, a number of label pieces are provided on the label sheets. Both lateral sides of the label sheet, including the portions with transfer holes, and zonal portions spaced in the longitudinal direction and including at least said perforations, are peeled away from the supporting sheet and removed. At the same time, the portion of the supporting sheet outside the slits are removed, and the edges of the removed portions on both lateral sides do not come into contact with the portions with transfer holes. (In this specification, this includes the portions where holes are planned.) The edge of the remaining label sheet extends in irregular form among the transfer holes so that it is closer to the ends than said portion with transfer holes toward both lateral sides. It is desirable that the edges of the detached and removed zonal portion of the label sheet have a non-linear shape.

According to the present invention, said detached and removed portion is continuous, and the processes of detaching and removing this portion are performed at the same time. Specifically, the steps of making the label paper consist of a transfer hole making step to provide transfer holes at equal spacings along both sides of the continuous paper strip which is to become the continuous label paper, finished width setting steps of forming slits at the positions corresponding to the edges of the finished width of the supporting sheet, a label piece forming step to furnish perforation lines to form label pieces which can be removed from the label sheet, a partition forming step to provide perforation lines in the label sheet for a certain number of label pieces at equal spacings in the longitudinal direction of the strip, and edges do not come into contact with the portion with transfer holes and are formed in an irregular shape so that they are positioned closer to the ends than said portion with transfer holes toward both lateral sides between each of the portions with transfer holes, a perforation line forming step to form perforation lines to facilitate the folding of continuous paper and spaced in the longitudinal direction at equal distances. These steps can be carried out in no specific order. At least after said partition forming step and said finished width step, a detachment step is performed to detach simultaneously the portion of the label sheet outwardly of the perforation line in the label sheet prepared during the partition forming step and the portion of the supporting sheet outwardly of the slits in the supporting sheet as prepared in the finished width setting step.

Because each unit of label sheets partitioned off contain a fixed number (either a single or plural) of label pieces is formed at equal distances in the longitudinal direction of the step according to the present invention, both lateral edges of the continuous strip furnished with the transfer holes are laterally connected at the portions corresponding to the spaces between the units, and the unnecessary portions of the label sheet which are in the shape of a ladder and are peeled off. Consequently, the continuity of the peeled off portions is maintained even when the lateral edges of the supporting sheet are cut off, and smooth detaching movement can be performed. By providing small holes, air penetration is improved, and the transfer of the continuous label paper during printing can be performed in an accurate way.

BRIEF DESCRIPTION OF THE DRAWINGS

FIGS. 7(*b*) and 7(*c*) are sectional views along lines 7*b*—7*b* and 7*c*—7*c* of FIG. 7(*a*); and FIG. 7(*d*) is a partial perspective view of the paper during its preparation.

DETAILED DESCRIPTION OF THE INVENTION

Figure 1:
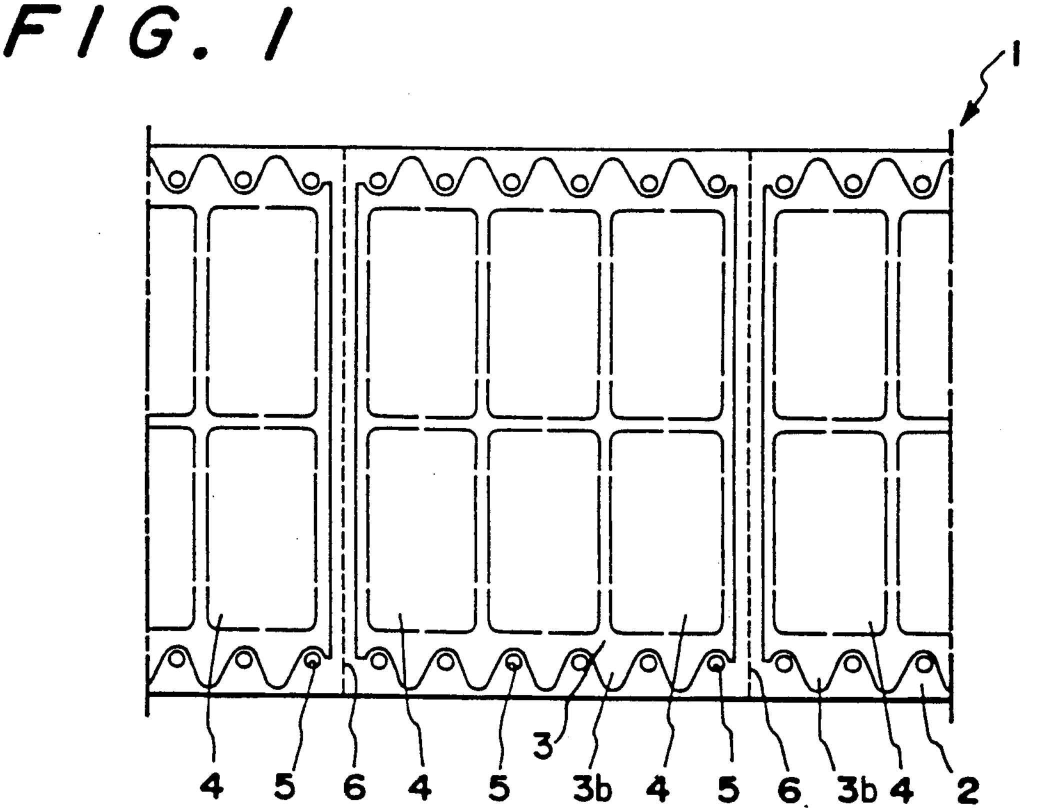
FIG. 1 is a plan view of a part of continuous label paper according to one preferred embodiment of the invention.

The continuous label paper 1 of the present invention consists of a supporting sheet 2 in continuous strip form and with the surface treated to allow separation therefrom of a number of unit label sheets 3, attached to the supporting sheet 2 by adhesive 25 coated on the back side of the label sheets (see FIG. 5) and detachably mounted at equal intervals in the longitudinal direction of the label paper. Each of said unit label sheets 3 constitutes a partition and six label pieces 4 which are formed in each of unit label sheets 3. In other words, one partition is formed for every six label pieces 4 and the partitions are spaced equally in the longitudinal direction of the label paper, and a perforation line is cut around each label piece 4 so that it can be easily separated from the partition. A number of transfer holes 5 are provided in said supporting sheet 2 at equal intervals along both lateral edges. At positions corresponding to the spaces between each of the unit label sheets 3 on said supporting sheet 2, a perforation line 6 extending transversely of the label paper is provided to facilitate the folding of the continuous strip of label paper 1 for every unit label sheet 3. The lateral edges of said unit label sheets 3 do not come into contact with the transfer holes 5, but they extend in irregular projections 36 so that they extend closer to the lateral edges than said transfer holes 5. Specifically, each of said unit label sheets 3 is formed by detaching and removing both lateral edges **7*b* of the label sheet, including the portion with transfer holes 5 (see FIG. 3) and zonal portions 7*c* corresponding to the spaces between successive unit label sheets 3 and having the perforation line 6. The edges 7b and zonal portions 7c constitute an unnecessary portion 7a (see FIG. 4) of label sheet 7 which is received during formation of the continuous label paper 8**.

The method of preparing the continuous label paper 1 as shown in FIG. 1 will now be described in conjunction with FIGS. 2–4. As shown in FIG. 5, the supporting sheet 2 with its surface treated to facilitate detachment is detachably mounted on the back side of the label sheet 7 coated with adhesive 25 to form a continuous paper 8. For better air penetration, one to five small visible holes 26 are provided per 1 $cm^2$ depending on the nature of the continuous paper 8.

Figure 2:
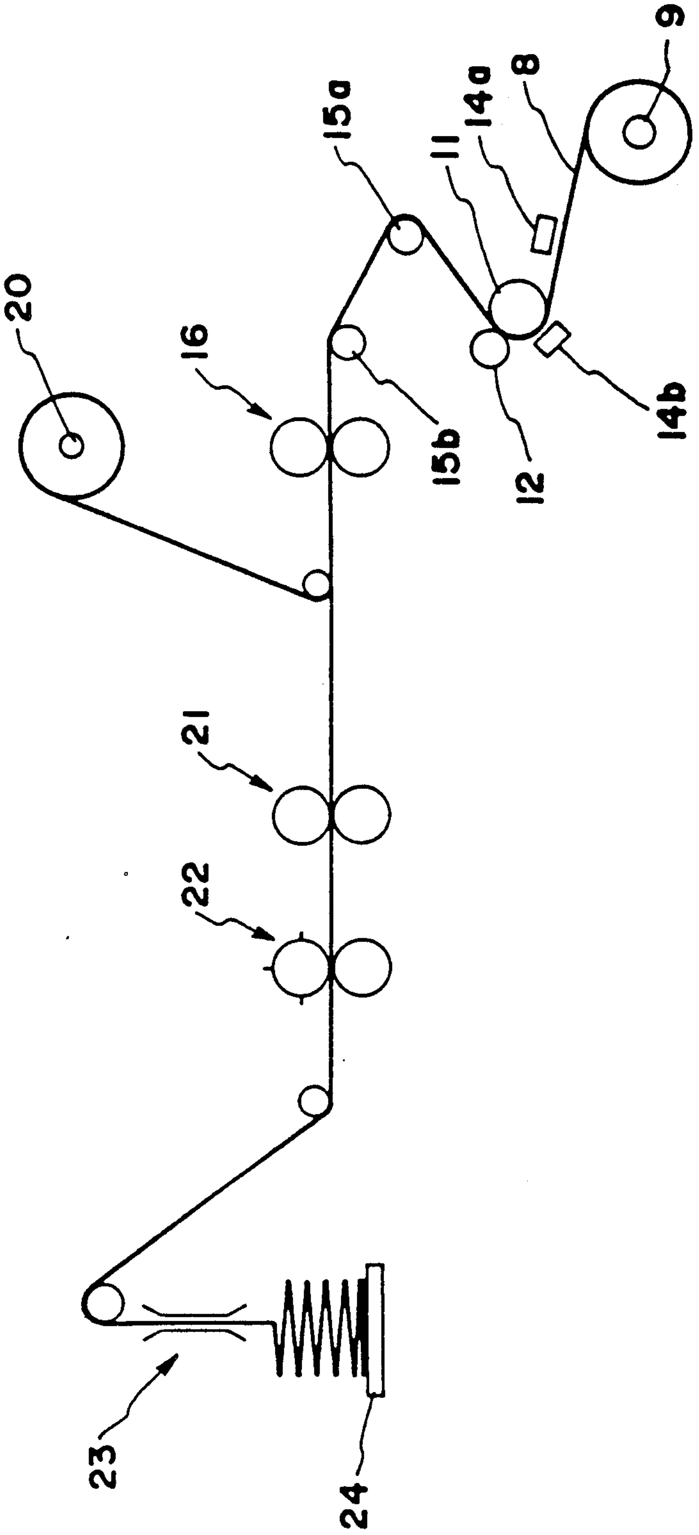
FIG. 2 is a schematic side view of an apparatus to prepare continuous label paper according to the invention from continuous paper.
Figure 3:
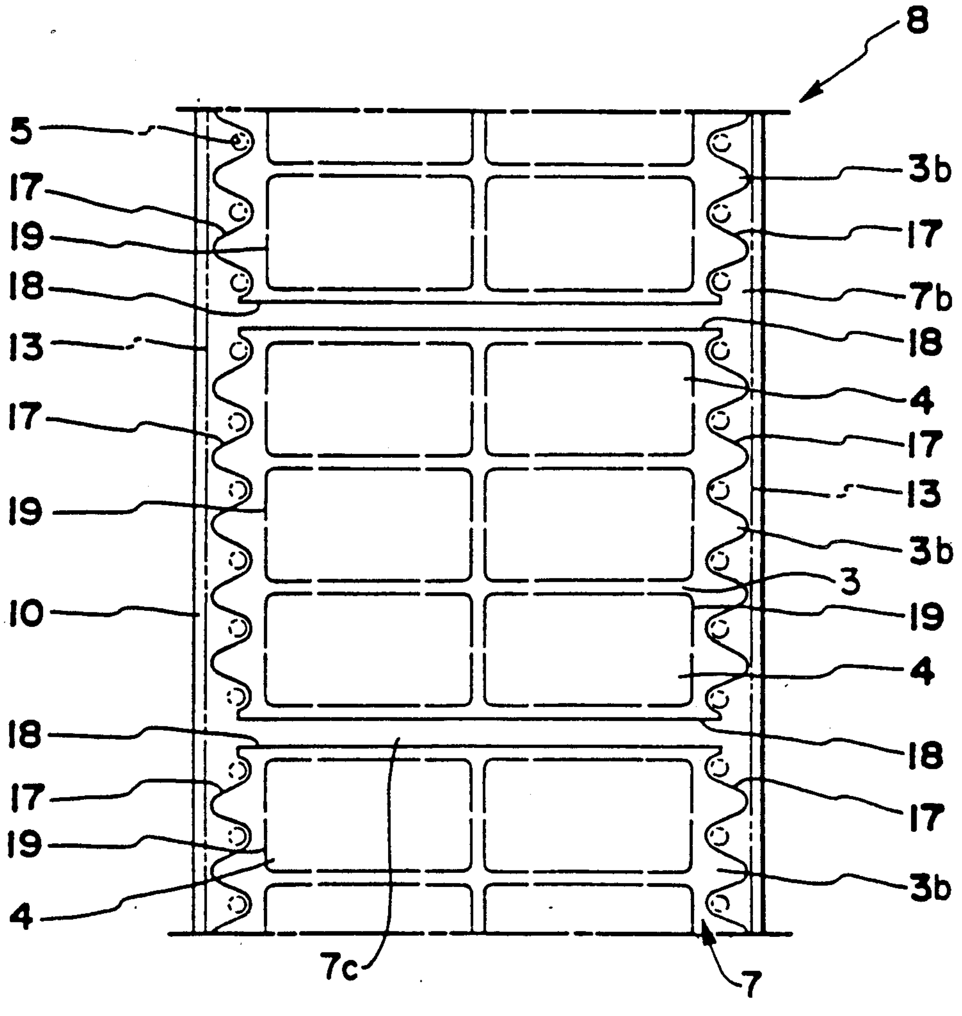
FIG. 3 is a plan view of a part of continuous label paper at an intermediate point in the preparation process.
Figure 4:
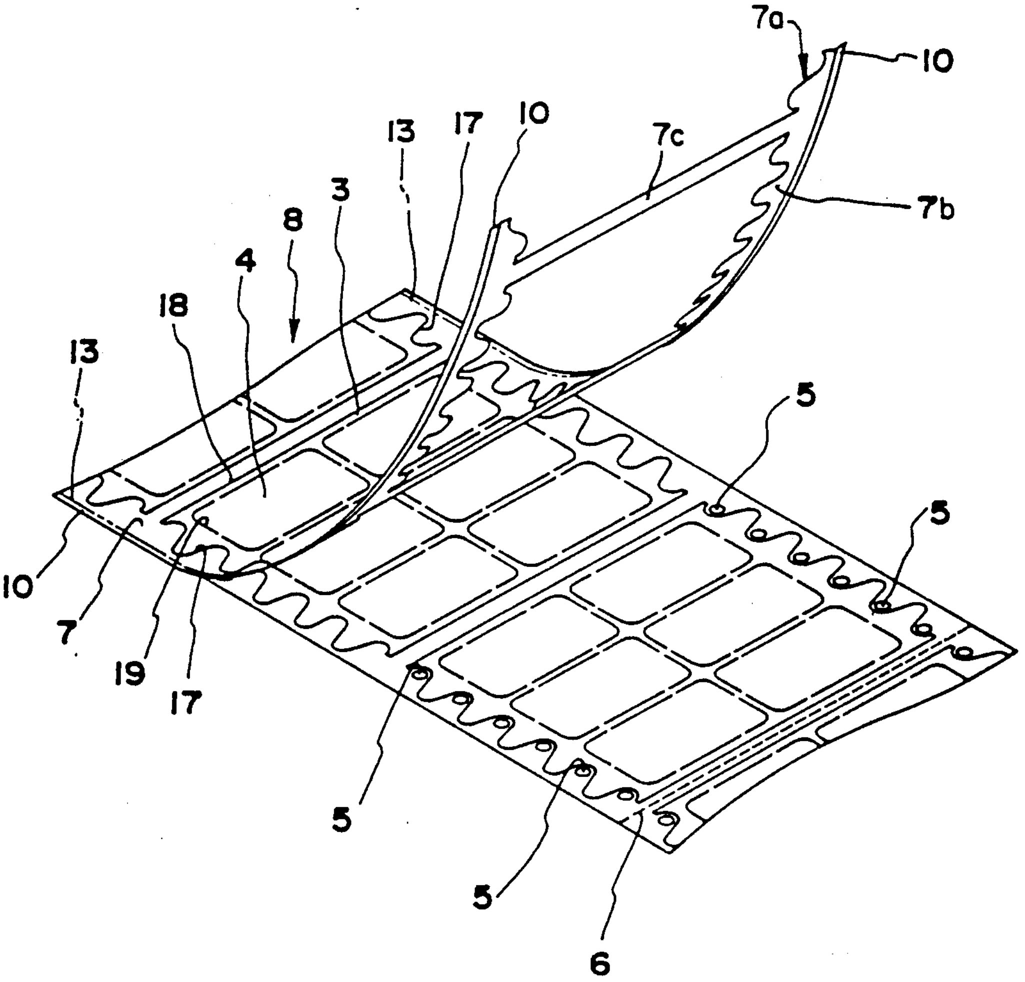
FIG. 4 is a perspective view of the continuous label paper of FIG. 3 with a part of the label sheet being peeled off.
Figure 5:
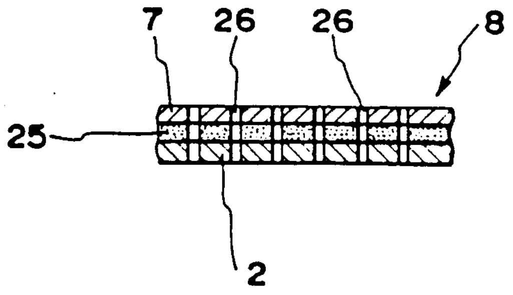
FIG. 5 is a partial cross-sectional view on an enlarged scale of the continuous label paper.
Figure 7A:
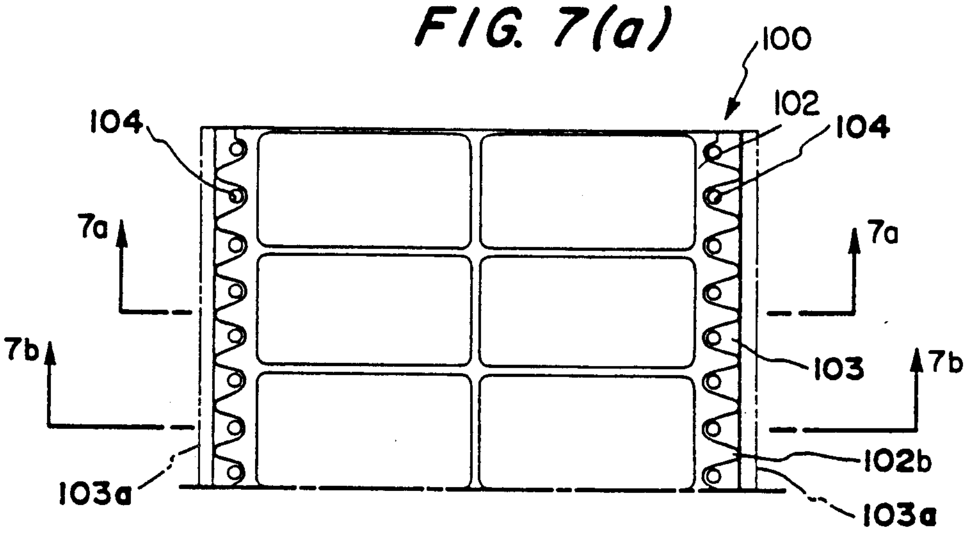
FIG. 7(*a*) is a plan view of a part of a prior art label paper.
Figure 7B:
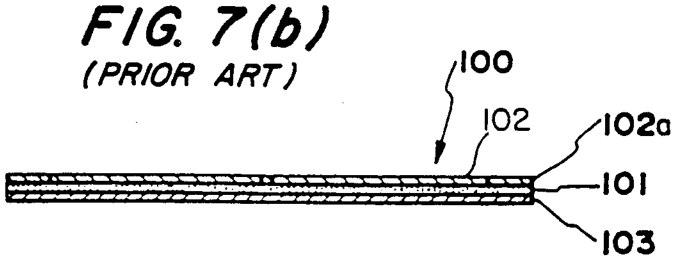
FIG. 7(b) (PRIOR ART)
Figure 7C:
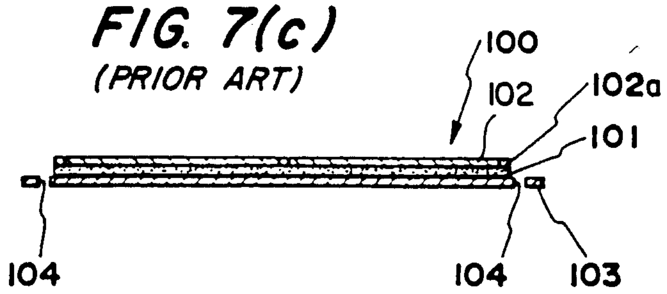
FIG. 7(c) (PRIOR ART)
Figure 7D:
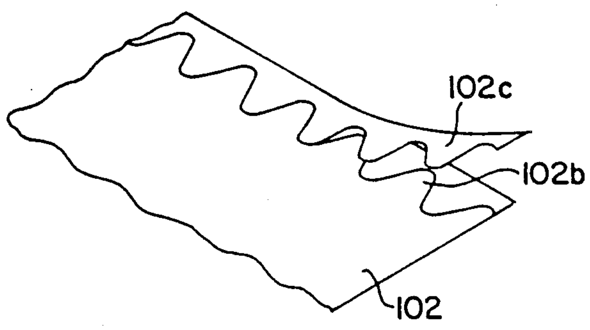
FIG. 7(d) (PRIOR ART)

As shown in FIGS. 2 and 3, the continuous paper 8 rolled up on the rotating roller 9 has surplus width portions 10 on both edges so that it is wider than the finished width (shown by dot-dash lines in FIG. 3) as is evident from FIGS. 3 and 4. It is fed intermittently from said rotating roller 9, and the fabrication is performed successively during the transfer.

As shown in FIG. 2, the continuous paper 8 thus fed is first introduced into the dust removal units 14a and 14b with the supporting sheet 2 on the bottom (see FIG. 4), and the paper dust on the surfaces of the supporting sheet 2 and the label sheet 7 is removed. Next, the slits 13 are formed by half-slitters 12, mounted so as to be opposed to the feeding roller 11, on the boundaries between the supporting sheet 2 and the surplus width portions 10. (See dot-dash line in FIG. 3.)

Then the continuous paper 8 guided by the guide rollers 15a and 15b is sent to the die-cutting cylinder 16 as shown in FIG. 2. Although not shown in the drawing, a blade of irregular shape is provided on the die-cutting cylinder 16 to form the irregular continuous cut line 17 of fixed length (see FIG. 3) to form the unit label sheet 3 in the label sheet 7 with an edge that does not come into contact with the portion of the sheet 7 where transfer holes are to be located (see FIGS. 1 and 3) and shaped so as to form recesses around the locations where transfer holes are to be formed. Also not shown in the drawing, a cutting blade is provided on said die-cutting cylinder 16 to form the cut lines 18 (see FIG. 3) in said label sheet 7 to define the leading and trailing edge of the unit label sheet 3 at equal intervals in the longitudinal direction. Also not shown in the drawing, a cutting blade is provided on the die-cutting cylinder 16 to form six approximately rectangular cut lines 19 (see FIG. 3) to define six label pieces 4 in said unit label sheet 3 and to form the corner in an R-shaped form. Consequently, the cut lines 17, 18 and 19 as described above are formed when the continuous paper 8 passes through said die-cutting cylinder 16 as shown in FIG. 3. In other words, the partition forming step and label piece forming step on the label sheet 7 are performed by said die-cutting cylinder 16 at the same time.

As is clear from FIGS. 2 and 4, the die cut continuous paper 8 is further transferred and the unnecessary portion 7a, constituted by the portion 7b of the label sheet 7 located outside the cut lines 17 and the zonal portions 7c between cut lines 18 and formed during the partition forming step, is removed by being peeled off and rolled up on the removal cylinder 20. At this time, the surplus width portions 10, located outside the slits 13 of the supporting sheet 2, are also peeled off and rolled up on said removal cylinder 2 together with said unnecessary portion 7a (see FIG. 4). In other words, the removal step is performed by said removal cylinder 20. As is evident from FIG. 4, said unnecessary portion 7a is shaped in the form of a ladder and can maintain its continuity as a whole even if it is partially cut or torn, and the above removal step can be performed in a smooth and positive manner.

If the slits 13 in the supporting sheet 2 are not exactly positioned and are placed more outwardly than the proper position, further slitting should be performed to slit the excessive portion by a slitter (not shown) so as to set the width to the proper finishing width after the above removal step.

Then, as shown in FIG. 2, the continuous paper 8 is introduced into the transfer hole forming unit 21, which in turn forms the transfer holes at equal intervals along both edges of the supporting sheet 2 between the projections 3b (see FIG. 4).

Next, the continuous paper 8 is sent to the perforating unit 22 as shown in FIG. 2, and the perforation lines 6 for folding are formed on the exposed portions of supporting sheet 2 between the unit label sheets 3 (see FIG. 4).

Thus, the continuous paper 8 is turned into continuous label paper 1 as shown in FIG. 1. Guided by the pendulum type folder 23 shown in FIG. 2, it is folded at each perforation line 6, and stacked up on the stacker 24.

The continuous label paper 1 thus prepared can provide the same effects as the continuous label paper 100 shown in FIG. 7 because the adhesive on or around the transfer holes 5 is removed. Because the surplus width portions 10 are on the continuous label paper until the removal step is performed according to this embodiment, it is advantageous in that both lateral edges of continuous paper 8 can be kept in a strong and firm condition.

As shown in FIG. 5, one to five small visible holes 26 are provided per 1 $cm^2$ of continuous paper 8, for example by a corona discharge unit. In the conventional type of label paper, 5000 seconds or more were required for the penetration of 100 cc of air as measured by an air permeability tester in accordance with JIS P 8117. This can now be reduced to 30–150 seconds. JIS P 8117 is one of the Japanese Industrial Standards, prescribing the method to test air permeability of paper and paperboard, through which 100 ml of air passes in 2–1800 seconds over an area of 645 $mm^2$. The tester according to this standard consists of an outer cylinder partially filled with oil and an inner cylinder which moves freely through the outer cylinder and is open or closed at the upper end. The inner cylinder is taken out and filled with the substance being tested. It is then placed into the outer cylinder and is gradually moved down to float it in oil. When the movement is stabilized, the time required for the scale (0–100 ml) on the inner cylinder to pass through the upper edge of the outer cylinder is measured by a stopwatch.

Figure 6:
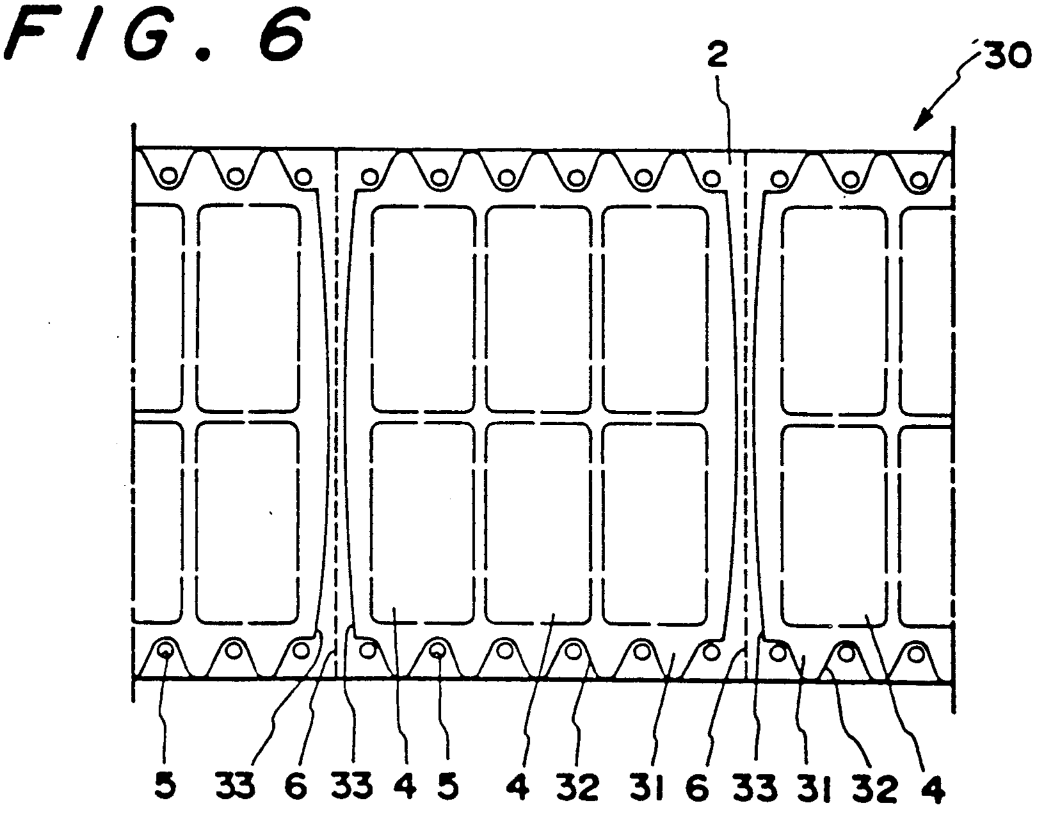
FIG. 6 is a plan view of a part of another embodiment of continuous label paper according to the invention.

FIG. 6 shows another embodiment of the continuous label paper according to the present invention. This paper 30 differs from the above-described embodiment in that the outermost position of the cut lines 32, which are the irregular cut lines forming the lateral edges of the unit label sheet 31 before the removal, extend to the edges of the finished width of the continuous label paper 30, and the cut lines 33, which are the cut lines extending in the lateral direction forming the zonal portion between unit label sheets 33 are formed in the shape of a curve, coming close to each other at the centers. The other details of the continuous label paper are not described here because they are the same as in the continuous label paper 1 described above. The same reference numbers indicate like parts.

In order to prepare continuous label paper of this type, the positions of the irregular blades on the die-cutting cylinder of the above-described embodiment which form the cut lines which will become the cut edges 32 must be changed. Also, the shape of the cutting blade to form the cut lines which will become the cut edges 33 must be changed, and a further slitting process must be performed to set the finished width after the removal step. In all other points, all steps are the same as described for the first embodiment. If the position of the irregular blade (to form the cut line which becomes the cut edge) is not changed and if the further slitting step is not performed in this embodiment, the continuous label paper will be formed, as in the case of the first embodiment, with the outermost ends of the projections **3*b* along edge 32 not reaching the lateral edges of continuous label paper 30**.

As described in this embodiment, if the cut edges 33, which will become the cut lines extending in the lateral direction and opposed to each other to form the zonal portion before the removal step, are formed in a curved shape at the center, no folding will occur along said cut edge 33 in the folding of the continuous label paper 30, but folding will be positively achieved at the perforation line 6.

As stated above, small holes 26 are furnished in continuous label papers 1 and 30 to give them air permeability of 30–150 seconds, and the transfer of such continuous label papers 1 and 30 have been proven to be excellent in most printers in print tests with several types of non-impact printers of the xerography type. Especially, for air permeability of 100 seconds or less, the same very good transfer results have been obtained as for normal high-quality paper, and the printing condition was also good because toner and ink were fixed well. Since the small holes 26 are of visible size, no problem is caused in the printing of the label pieces 4, and neither hindrance nor inconvenience to the adhesive function or appearance of the label pieces 4 occurs.

It should be understood that this invention is not limited to the embodiments as described above. For instance, the transfer holes forming step, the label piece forming step and the partition forming step may be performed in any order, and there is no need to perform the label piece forming step and the partition forming step at the same time. Also, the irregular shape of the cut line, which is to become the cut line 17 or the cut edge 32, is not limited to a curved shape, and it may have the shape of polygonal lines such as triangular, rectangular, etc. Further, in the label piece forming step, the number of label pieces 4 to be formed in the unit label sheets 3 and 31 (including the planned portion) is not limited to six, but may be one or more as desired. If the number of label pieces is one, the cut line 18 extending in the lateral direction of the continuous paper 8 in the partition forming step can be simultaneously used as the cut line for the label piece 4 extending in the same direction. It does not matter whether the outermost position of the irregular cut line 8 or the cut line which is to become the cut edge 32 reaches the finished width of the continuous label paper 2, or whether the cut lines 18 extending in the lateral direction and opposed to each other to form the zonal portion of the cut line which is to become the cut edge 33 has a linear shape or a curved shape. Any combination will suffice. The perforation line 6 to be formed between unit label sheets 3 and 31 (including the planned portion) need not necessarily be formed between each of the unit label sheets 3 and 31, but may be formed between every other sheet.

As is evident from the above description, the continuous label paper suitable for a non-impact printer can be easily and efficiently prepared according to the present invention. Especially, since the unnecessary label sheet portion to be peeled off in the removal step is in the form of a ladder and is removed while the side portions are laterally coupled, it can maintain its continuity as a whole even if it is partially torn or cut during removal, and this ensures a trouble-free and positive removal operation. Also, better air permeability is obtained because there are a number of small holes provided, and the printing operation by a non-impact printer can be performed smoothly and efficiently.

I claim:

1. A method of preparing continuous label paper from a continuous paper consisting of a label sheet coated with an adhesive on the back side thereof and a support sheet detachably adhered to the back side of said label sheet and which sheets are wider than a finished width of said continuous label paper, said method comprising the steps of:

forming a plurality of transfer holes at equal intervals along both lateral edges of the finished width of at least said supporting sheet of the continuous paper;

forming slits along the side portions of said supporting sheet at positions corresponding to the finished width of said continuous label paper to define excess width portions lateraly outwardly of said slits;

cutting cut lines in said label sheet to form label pieces in said label sheet spaced at intervals in the longitudinal direction of said label sheet;

cutting edge lines in said label sheet adjacent lateral edge portions thereof at positions where said edge lines do not overlie portions of said support sheet corresponding to transfer holes, and which edge lines have an irregular shape defining projections extending closer to the lateral edges of the finished width of said supporting sheet than the positions of said transfer holes, thereby defining unnecessary label sheet portions laterally outwardly of said edge lines;

said steps being performed in any order; and at least after said edge line cutting step and said slit forming step, simultaneously removing the excess width portions and said unnecessary label sheet portions from said supporting sheet.

2. A method as claimed in claim 1 further comprising the step of forming perforations in said supporting sheet extending transversely of said supporting sheet and between successive label pieces.

3. A method as claimed in claim 1 further comprising, in the step of cutting cut lines to form label pieces, spacing portions of said cut lines extending transversely of said label sheet for defining between successive label pieces a zonal portion extending between the unnecessary label sheet portions on opposite sides of said label sheet, and said removing step includes the removal of said zonal portions and said unnecessary portions and said excess width portions as a single piece having the general shape of a ladder.

* * * * *